United States Patent [19]

Tatematsu

[11] Patent Number: 4,553,617
[45] Date of Patent: Nov. 19, 1985

[54] ARTICLE DISCHARGE APPARATUS IN AUTOMATIC WEIGHING SYSTEM

[75] Inventor: Takashi Tatematsu, Shiga, Japan

[73] Assignee: Kabushiki Kaisha Ishida Koki Seisakusho, Kyoto, Japan

[21] Appl. No.: 510,097

[22] Filed: Jul. 1, 1983

[30] Foreign Application Priority Data

Jul. 6, 1982 [JP] Japan .................. 57-102649[U]

[51] Int. Cl.⁴ .................. G01G 19/22; G01G 13/16; B65B 1/04; B67D 3/00
[52] U.S. Cl. ........................ 177/25; 177/59; 177/108; 141/106; 141/238; 222/485
[58] Field of Search .................. 177/25, 59, 105, 108; 141/83, 106, 234, 238

[56] References Cited

U.S. PATENT DOCUMENTS

| 4,184,523 | 1/1980 | Carrigan et al. | 141/238 |
| 4,308,928 | 1/1982 | Oshima | 177/25 |
| 4,465,150 | 8/1984 | Matsumoto | 177/25 |

Primary Examiner—George H. Miller, Jr.
Attorney, Agent, or Firm—Staas & Halsey

[57] ABSTRACT

An apparatus for discharging weighed articles from an automatic weighing system, having a plurality of hoppers for discharging batches of articles into a plurality of containers. A movable chute successively introduces batches of weighed articles, discharged from the weighing system, into each of the hoppers. When all of the hoppers have been supplied with batches of articles the hoppers are opened simultaneously.

11 Claims, 6 Drawing Figures

ARTICLE DISCHARGE APPARATUS IN AUTOMATIC WEIGHING SYSTEM

BACKGROUND OF THE INVENTION

This invention relates to an apparatus for discharging weighed articles in an automatic weighing system. More particularly, the invention relates to an apparatus for discharging weighed articles into a contiguous container array delivered to the discharge area in the form of a plurality of transversely interconnected containers, the apparatus being adapted to discharge the articles into the plurality of transversely arrayed containers at one time.

A weighing system is available wherein a packaging apparatus is combined with a weighing apparatus. The system is so arranged that articles are weighed out into batches of a fixed weight, with each batch being charged into successively arriving containers and then packaged in continuous fashion. The time that the packaging apparatus needs to supply the containers and package them when provided with the articles is longer than that required for a single weighing cycle performed by the weighing apparatus. As a result, it has not been possible to exploit the full processing capacity of the weighing apparatus, making it difficult to raise the efficiency of the overall operation.

The containers into which the articles are discharged are often fabricated from plastic or aluminum foil by a technique such as deep drawing. As shown in FIG. 1, such containers are actually manufactured in the form of a unitary container array B composed of a plurality of contiguous, compartment-like containers A, . . . A which are transversely interconnected. When using the container array in the conventional weighing and packaging system described above, the container array B is cut so as to separate the containers A into individual units which must then be supplied to the apparatus in a single row. Then, after weighed articles are discharged into the separate containers A, a packaging operation must be performed for each and every container. The result is a great increase in the number of process steps.

SUMMARY OF THE INVENTION

An object of the present invention is to provide a novel apparatus for discharging articles in an automatic weighing system, wherein the capability of the weighing system can be exploited to the maximum extent.

Another object of the present invention is to provide an apparatus for discharging articles in an automatic weighing system, wherein a contiguous array of containers can be delivered to receive discharged articles without requiring that the contiguous array be cut into individual containers.

A further object of the present invention is to provide an apparatus for discharging articles in an automatic weighing apparatus, wherein a container delivery operation or packaging operation in a packaging apparatus need be performed only once with respect to a plurality of weighing cycles performed by the weighing system, thereby enabling the weighing system to be utilized with maximum efficiency.

In accordance with the present invention, the foregoing objects are attained by providing an apparatus for discharging weighed articles in an automatic weighing system, the apparatus having a plurality of lower timing hoppers disposed in a row above a packaging apparatus, and a movable chute disposed between the row of timing hoppers and a discharge outlet of a collecting chute in a weighing unit, the movable chute being reciprocated linearly along the row of timing hoppers to successively supply each of the timing hoppers with weighed articles that are discharged from the collecting chute at the end of each weighing cycle performed by the weighing unit. When each of the timing hoppers has received a supply of the weighed articles, means are operable to open all timing hoppers in unison, whereby the articles are discharged from each timing hopper into respective ones of underlying containers constituting a unitary container array.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 2:
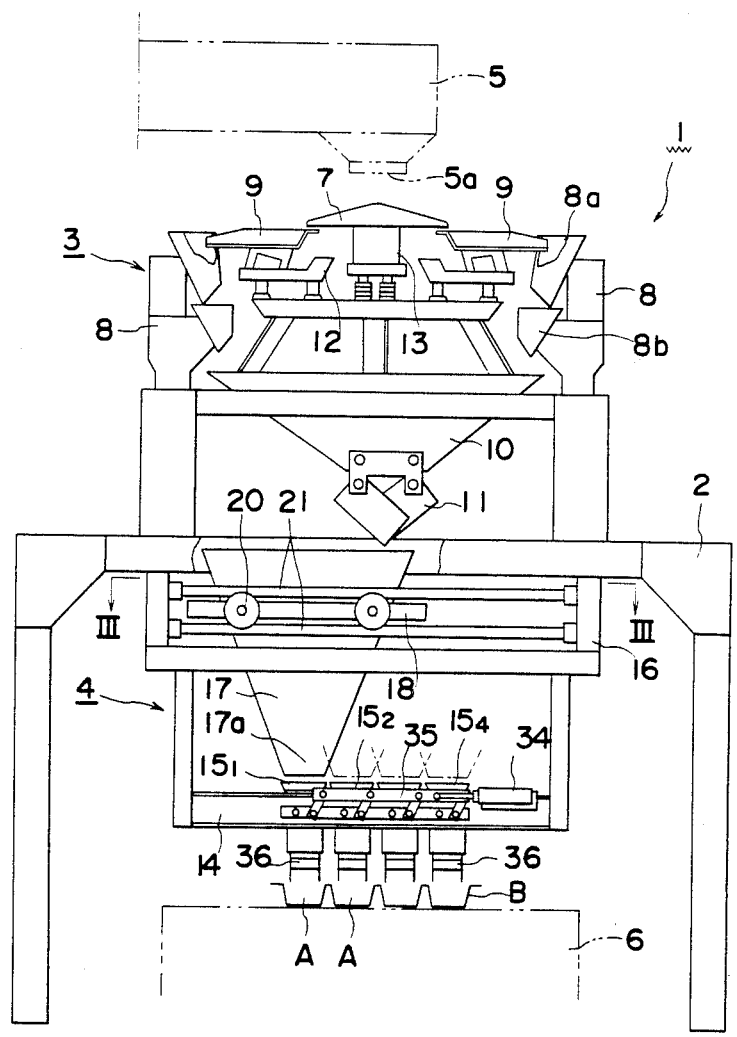
FIG. 2 is a front view showing a combinatorial weighing-type automatic weighing system having an article discharge apparatus according to an embodiment of the present invention.

Referring to FIG. 2, a combinatorial weighing-type automatic weighing system 1 includes a weighing unit 3 disposed on a base 2 having a longitudinal axis, and an article discharge apparatus 4 disposed below the weighing unit 3. A device 5 for supplying articles to be weighed is disposed above the weighing unit 3, and a packaging apparatus 6 is disposed below the discharge apparatus 4. The weighing unit 3 comprises a dispersing table 7 situated beneath a discharge port 5a of the supply device 5, a plurality of weighing machines 8 arranged around the circumference of the dispersing table 7, supply troughs 9, equal in number to the weighing machines 8, disposed radially from points below the dispersing table 7 to points above corresponding pool hoppers 8a of respective weighing machines 8, and a collecting chute 10 for gathering weighed articles discharged from weighing hoppers 8b of respective weighing machines 8, the articles dropping to a discharge port at the lower end of the chute. The chute discharge port is equipped with an upper timing hopper 11 adapted to open and then close at the completion of each weighing cycle performed by the weighing unit. Each trough 9 is equipped with a vibrator 12, and the dispersing table 7 is equipped with a vibrator 13, the vibrators being actuated when articles to be weighed are supplied to the weighing machines 8.

Figure 3:
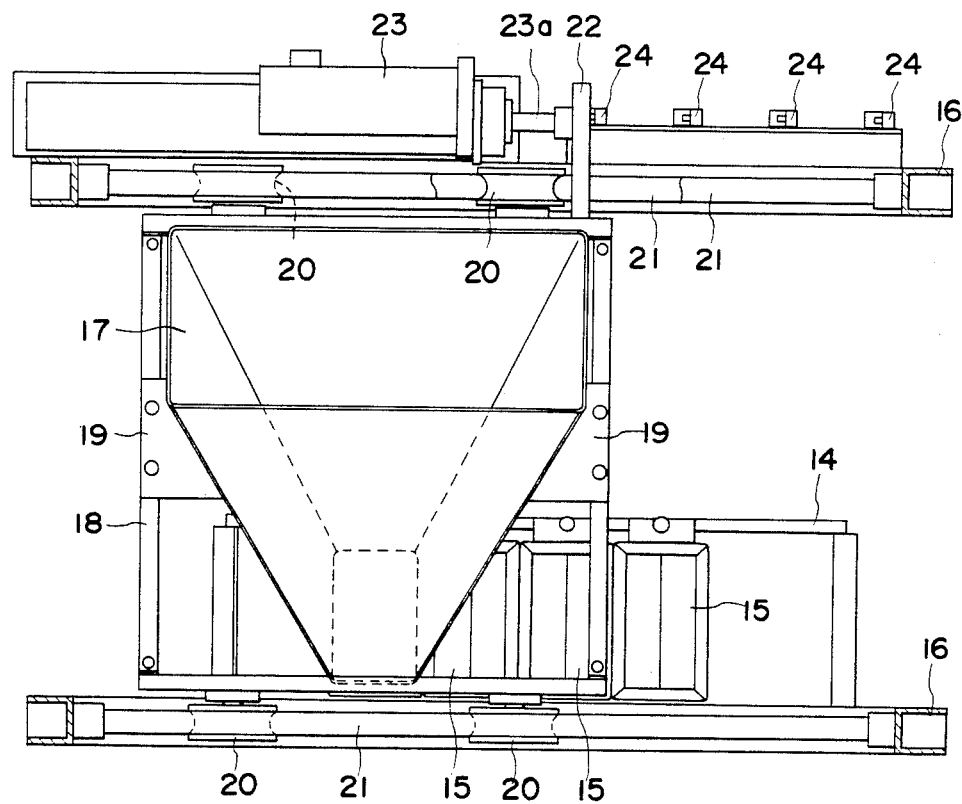
FIG. 3 is an enlarged plan view of a transverse section of an article discharge apparatus as seen along line III—III of FIG. 2.

The discharge apparatus 4 comprises a plurality (four in the illustrated embodiment) of lower timing hoppers 15 disposed on a hopper supporting frame 14 in a single row transversely of the system for discharging weighed articles to the packaging apparatus 6, and a movable chute 17 supported on a chute supporting frame 16 between the lower timing hoppers 15 and the upper timing hopper 11 of the weighing unit 3. As shown in the enlarged view of FIG. 3, the chute 17 is secured to a rectangular movable frame 18 via a bracket 19. Two pairs of rollers 20, each pair supported axially on opposite sides of the movable frame 18, engage transversely extending upper and lower rails 21, 21 of the chute supporting frame 16. The chute 17 is thus capable of being moved transversely of the system along its longitudinal axis. A rod 23a of a drive cylinder 23 is connected to the movable frame 18 through a bracket 22. There are provided a plurality of limit switches 24, . . . 24 which, when contacted by the bracket 22, sense the position of the movable frame 18 and, hence, the position of the movable chute 17. The arrangement is such that, in response to a signal from any of the switches 24, the movable chute 17 is stopped just as a a discharge port 17a thereof arrives at a position above a corresponding one of the timing hoppers 15.

Figure 1:
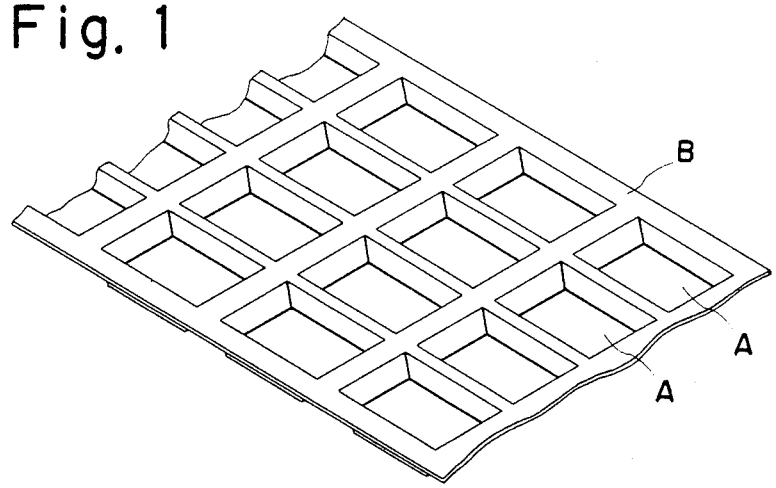
FIG. 1 is a perspective view showing a portion of a unitary container array used in the article discharge apparatus of the present invention.
Figure 4:
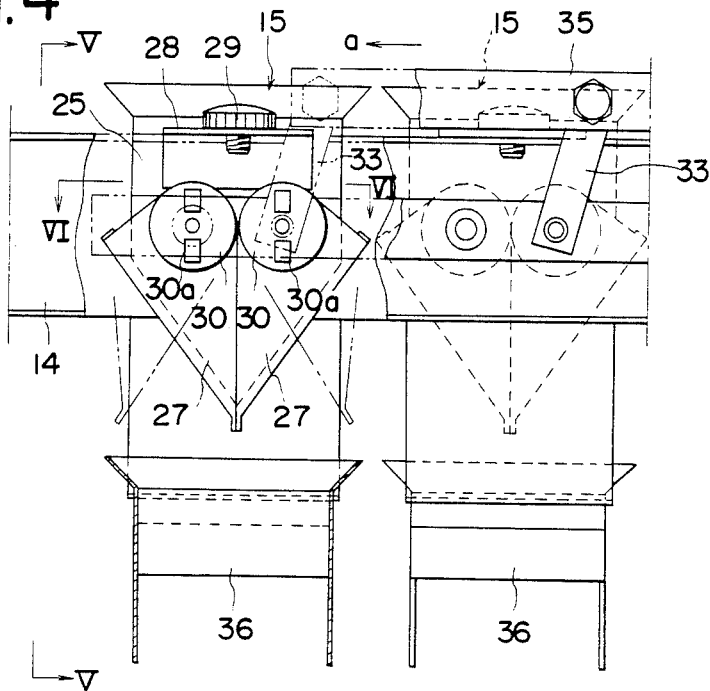
FIG. 4 is an enlarged front view, partially shown in longitudinal section, illustrating lower timing hoppers and equipment adjacent thereto.
Figure 5:
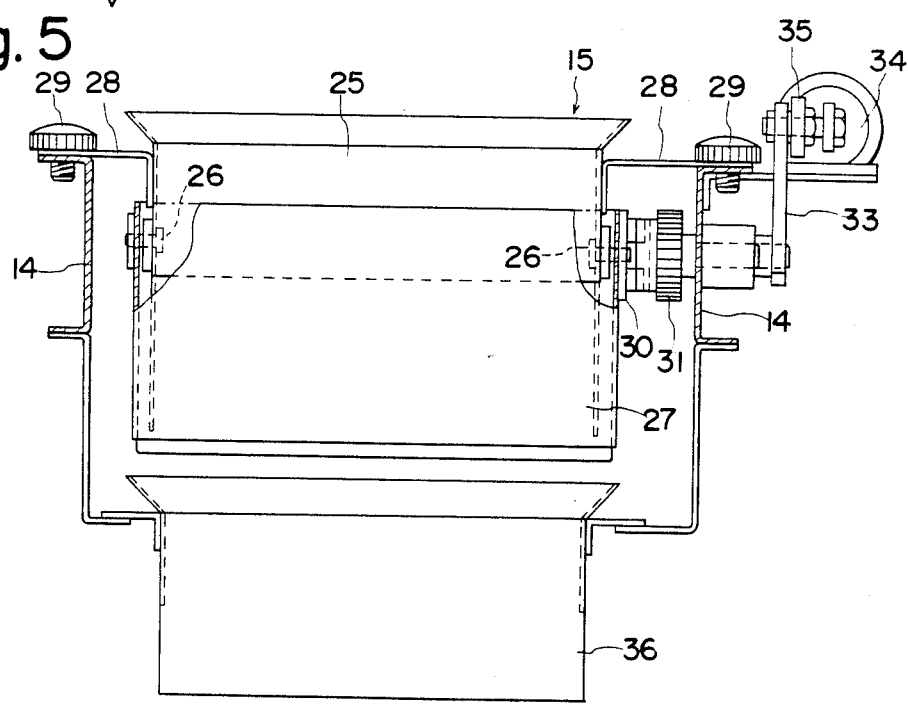
FIG. 5 is a longitudinal sectional side view as seen along line V—V of FIG. 4.
Figure 6:
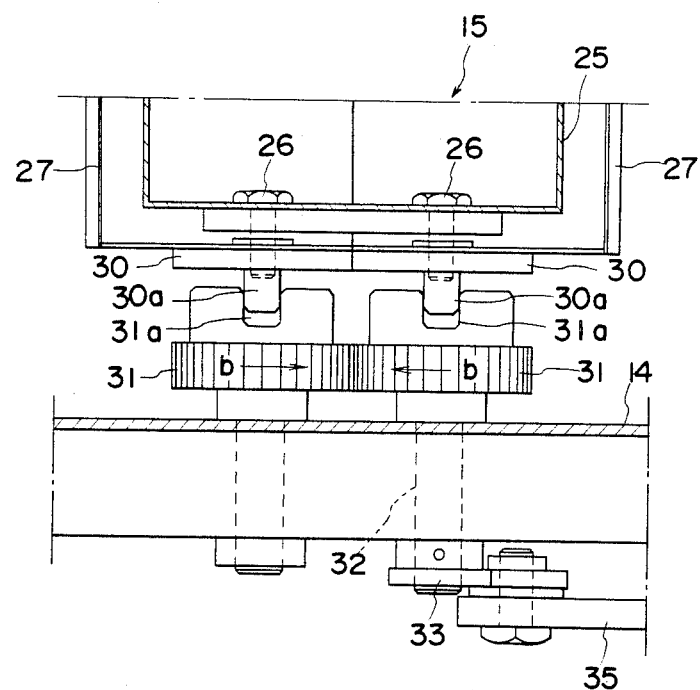
FIG. 6 is an enlarged plan view of a transverse section seen along line VI—VI of FIG. 4.

Reference will now be had to FIGS. 4 through 6 to describe the construction of the lower timing hoppers 15 as well as the opening and closing mechanism thereof. Each timing hopper 15 comprises a main body 25 having an upper end for introducing weighed articles and a base end, the upper and lower ends both being open, and a pair of discharge gates 27, 27 oscillatably supported on opposite sides of the main body 25 by pins 26, the discharge gates being oscillatable between the attitude shown by the solid lines in FIG. 4 and the attitude shown by the dot-and-dash line to open and close the base end of the main body 25. Brackets 28, which are fixedly provided on opposite sides of the main body 25, are set upon the hopper supporting frame members 14 on either side of the hopper 15, and the brackets 28 are secured to the frame members by respective screws 29. Rotating members 30 having projections 30a are secured to one side face of the discharge gates 27, with the above mentioned pins 26 being rotatably fit into the rotating members 30 at their center of rotation. The supporting frame 14 axially supports a pair of mutually meshing gears 31. Each gear 31 has a groove 31a formed in one side face, the grooves 31a mating with corresponding ones of the projections 30a of the rotating members 30. An arm 33 is connected to the shaft 32 of one of the gears 31 of the lower timing hopper 15. As shown in FIGS. 2 and 4 arms 33, each associated with one of the hoppers 15, are connected to a connecting rod 35 reciprocated by a cylinder 34. Numerals 36 denote guide chutes situated beneath respective ones of the lower timing hoppers 15. Each of the containers A of the contiguous container array B (FIG. 1) supplied by the packaging apparatus 6 is positioned beneath the chutes 36 so as to correspond thereto.

In operation, articles to be weighed, which are supplied from the supply device 5 to the weighing unit 3 of the weighing systm 1, are dispensed into each of the pool hoppers 8a and weighing hoppers 8b in the plural weighing machines 8 by way of the dispersing table 7 and troughs 9. The collection of articles in each of weighing hopper 8b of the respective weighing machine 8 is then weighed. Based on the obtained weight values, a computer (not shown) selects a combination of the weighing machines 8 whose articles will give a total weight value equivalent to a predetermined target weight. Only those articles in the weighing machines 8 selected are discharged from the corresponding weighing hoppers. In this manner, articles weighed out to the target weight are released into the upper timing hopper 11 through the collecting chute 10. Thus the articles received in the timing hopper 11 will constitute a batch of a given weight, this being equivalent to the target weight. Those weighing hoppers 8b which have released their articles are immediately resupplied with articles from the pool hoppers 8a to prepare them for the next weighing cycle. These pool hoppers 8a, which will now be empty because of the articles delivered to resupply the underlying weighing hoppers, are themselves resupplied with articles from the dispersing table 7 by actuating the vibrators 12 of the corresponding troughs 9.

The foregoing steps constitute one weighing cycle performed by the weighing unit 3. At the conclusion of the weighing cycle, the upper timing hopper 11 is opened to release the weighed out batch of articles into the movable chute 17. At this time the discharge port 17a of the movable chute 17 will be situated above the first timing hopper, designated $15_1$ in FIG. 2, of the plurality of timing hoppers 15. Accordingly, the batch of articles released into the movable chute 17 is discharged into the first weighing hopper $15_1$. At the conclusion of this discharge cycle, the movable chute 17 is shifted by the cylinder 23 to position the discharge port 17a over the second timing hopper $15_2$. As this is being carried out, a second weighing cycle is performed by the weighing unit 3, at the end of which the upper timing hopper 11 will open to release the weighing out batch of articles into the second lower timing hopper $15_2$ via the movable chute 17, the latter having been shifted to the proper position by this time. Through this process, article batches weighed out in each weighing cycle of the weighing unit 3 are successively introduced into the plural lower timing hoppers $15_1, 15_2 \ldots 15_n$.

Eventually, batches of articles will be introduced into all of the lower timing hoppers 15. When this is accomplished, the cylinder 34 is actuated to move the connecting rod 35 in the direction of the arrow a in FIG. 4, thereby moving the upper ends of the arms 33 in the same direction. This causes the pair of gears 31 of each timing hopper 15 to rotate in the directions of the arrows b in FIG. 6, whereby the pairs of discharge gates 27 belonging to all of the timing hoppers 15 are opened in unison by the action of the corresponding rotating members 30, the projections 30a whereof are mating with the grooves 31a of the gears 31. Thus, the articles being retained by the timing hoppers 15 are discharged at one time into one transverse row of the the underlying containers A of the contiguous container array B by way of the guide chutes 36.

When the foregoing has been accomplished, the packaging apparatus 6 is operated to shift the container array B by one step to bring the next transverse row of plural containers A into position beneath respective ones of the guide chutes 36. At the same time, those of the containers A which have received their articles are packaged by a film sheet heat-sealing process or the like. The operation of shifting the container array B and packaging the filled containers A is performed by the packaging apparatus 6 each time articles are being introduced into all of the timing hoppers 15. Therefore, the speed at which the packaging apparatus operates can be much slower than the speed of the weighing operation performed by the weighing unit 3 (i.e., one-forth the speed of the weighing operation in the illustrated embodiment). This means that the weighing unit can operate at maximum efficiency regardless of the limited operating speed of the packaging apparatus.

In one operating stroke, the movable chute 17 travels from the first lower timing hopper $15_1$ to the last lower timing hopper $15_4$, introducing articles successively into each one. If these steps for introducing the articles into the lower timing hoppers are repeated for the operating stroke in the opposite direction, namely from the fourth to the first timing hoppers $15_4$ to $15_1$, then each stroke of the movable chute 17 will accomplish more work per stroke. Further, in the illustrated embodiment, each lower timing hopper 15 has its lower or base end opened and closed by the pair of discharge gates 27, so that articles can be discharged from the hopper instantly without scattering. This contributes to a much faster and accurate weighing operation.

In the illustrated embodiment, the base 2 is fitted with the discharge apparatus 4 via the supporting frames 14, 16, the discharge apparatus forming an integral part of the base. To facilitate maintenance, inspection and cleaning, however, an arrangement is possible wherein the discharge apparatus 4 can be separated from the base 2 or weighing unit 3 and placed directly upon the floor.

In accordance with the present invention as described and illustrated hereinabove, it is possible to use the unitary container array consisting of a plural, transversely interconnected containers. Therefore, the unitary container array need not be cut into individual containers before being supplied to the weighing system, and it is also unnecessary to package the containers one at a time. In addition, regardless of the fact that the operating speed of the packaging apparatus used in combination with the weighing system is slower than the speed of the weighing operation performed by the weighing unit, the capability of the weighing system can be exploited to the maximum extent. The invention therefore raises operating efficiency, particularly in operations where weighing and packaging are performed in continuous fashion.

As many apparently widely different embodiments of the present invention can be made without departing from the spirit and scope thereof, it is to be understood that the invention is not limited to the specific embodiments thereof except as defined in the appended claims.

What we claim is:

1. An apparatus for discharging weighed articles from an automatic weighing system into a plurality of containers, the automatic weighing system being of the type in which a weighing unit weighs and then discharges articles from a collecting chute having a discharge port at the conclusion of each weighing cycle, comprising:
    a base having a longitudinal axis;
    a plurality of timing hoppers disposed on said base above respective ones of the containers;
    a movable chute, transportable along said longitudinal axis of said base, for successively introducing weighed articles, discharged from the collecting chute, into each of said timing hoppers; and
    means, provided on said base, for opening all of said timing hoppers in unison when all of said timing hoppers are provided with articles by said movable chute.

2. The apparatus according to claim 1, wherein said movable chute is reciprocated along a straight line.

3. The apparatus according to claim 1, wherein each timing hopper comprises a main body having an open base end and a pair of discharge gates closing the base end, said pair of discharge gates being able to swing away from each other when articles are to be discharged from said timing hopper.

4. The apparatus according to claim 3, wherein said main body has at least one pin and each of said discharge gates of each timing hopper is oscillatably supported by said pin.

5. The apparatus according to claim 4, wherein each of said discharge gates has a supporting member having a center and a projection secured to one side face thereof, said pin being rotatably fitted into the supporting member at the center of said supporting member.

6. The apparatus according to claim 5, wherein a pair of gears axially supported on said base are associated with each hopper, said gears having a side face and one of said gears in each pair of gears having a groove formed in said side face and wherein said projection mates with said groove formed in said side face of a corresponding one of said pair of gears.

7. The apparatus according to claim 6, further comprising a connecting rod and a cylinder wherein an arm is connected to a shaft of one of said pair of gears, said arm being connected to said connecting rod and said connecting rod is reciprocated by said cylinder.

8. An apparatus for receiving articles from a combinatorial weighing apparatus and discharging articles, comprising:
    a frame having a longitudinal axis;
    a plurality of hoppers provided on said frame;
    a chute, provided above said hoppers for receiving said articles and introducing them into said hoppers, said chute being transportable along said longitudinal axis of said frame; and
    means, provided on said frame, for opening said hoppers.

9. An apparatus according to claim 8, wherein said hoppers are arranged along the longitudinal axis of said frame.

10. An apparatus according to claim 8, wherein each hopper includes a main body having an open base end and a pair of discharge gates provided at said open base end of said main body, said discharge gates being rotatably mounted on said main body.

11. A combinatorial weighing apparatus, comprising:
    a base having a longitudinal axis;
    means, provided on said base, for weighing batches of articles;
    a plurality of hoppers provided on said base;
    a chute provided on said base, below said weighing means, for receiving said batches of weighed articles and introducing them into said hoppers, said chute being transportable along said longitudinal axis of said base; and
    means, provided on said base, for opening said hoppers.

* * * * *